United States Patent [19]

Nachbur et al.

[11] 4,211,814
[45] Jul. 8, 1980

[54] METHOD FOR THE FIREPROOFING OF SYNTHETIC FIBER MATERIAL

[75] Inventors: Hermann Nachbur, Dornach; Peter Rohringer, Basel, both of Switzerland

[73] Assignee: Ciba-Geigy Corporation, Ardsley, N.Y.

[21] Appl. No.: 932,082

[22] Filed: Aug. 8, 1978

Related U.S. Application Data

[63] Continuation of Ser. No. 809,824, Jun. 24, 1977, abandoned, which is a continuation of Ser. No. 638,227, Dec. 5, 1975, abandoned.

[30] Foreign Application Priority Data

Dec. 6, 1974 [CH] Switzerland .................. 16252/74

[51] Int. Cl.² .................. C09K 3/28; B05D 3/02; D06M 13/08
[52] U.S. Cl. .................. 428/265; 427/393.3; 427/394; 427/396; 428/267; 428/272
[58] Field of Search .................. 427/394, 396, 390 D; 428/272, 265, 267

[56] References Cited

U.S. PATENT DOCUMENTS 3,365,505  1/1968  Norell .................. 260/648 R
3,455,873  7/1969  Jenkner .................. 260/648 R
3,660,533  5/1972  Drake et al. .................. 252/8.1
3,839,140  10/1974  Tyler et al. .................. 428/921

Primary Examiner—James R. Hoffman
Attorney, Agent, or Firm—Prabodh I. Almaula

[57] ABSTRACT

The invention provides a fireproofing composition which contains at least (a) a bromine compound of the formula

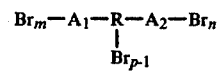

wherein
  $A_1$ and $A_2$ are cycloalkyl,
  R is alkylene,
  m and n each are an integer from 2 to 7, and
  p is an integer from 1 to 5;
(b) optionally a brominated cycloalkane;
(c) a dispersing agent;
(d) optionally a protective colloid; and
(e) optionally water.

This fireproofing composition is used for fireproofing synthetic fiber material.

15 Claims, No Drawings

METHOD FOR THE FIREPROOFING OF SYNTHETIC FIBER MATERIAL

This is a continuation of application Ser. No. 809,824 filed on June 24, 1977, which is a continuation of Application Ser. No. 638,227, filed Dec. 5, 1975, both now abandoned.

The invention relates to a fireproofing composition which contains at least
(a) a bromine compound of the formula

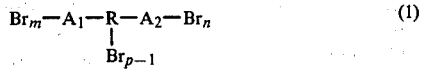

wherein
$A_1$ and $A_2$ each represent cycloalkyl having 5 to 8 ring carbon atoms,
R represents alkylene having 1 to 4 carbon atoms,
m and n each represent an integer from 2 to 7, and
p represents an integer from 1 to 5;
(b) optionally a brominated cycloalkane having 7 to 12 ring carbon atoms and 4 to 6 bromine atoms bound to these ring carbon atoms;
(c) a dispersing agent;
(d) optionally a protective colloid; and
(e) optionally water.

This fireproofing composition is used, in particular, for fireproofing synthetic fiber material, especially textiles, made from polyester or polyamide.

Preferred constituents (a) contain 30 to 90 per cent by weight of bromine and correspond to the formula

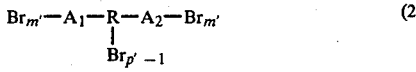

wherein
$A_1$, $A_2$ and R have the given meaning, and
m' stands for 2 or 3, and
p' stands for 1, 2 or 3,
and in particular to the formula

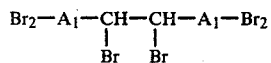

wherein
$A_1$ has the given meaning.

In the case of the constituent (a) and of the optionally present constituent (b), these can be either solid or liquid brominated compounds. Solid compounds are however preferred, i.e. those that are in the solid state of aggregation up to 20° C. Particularly suitable compounds are those having a melting point of between 80° and 230° C., especially between 100° and 225° C.

Examples of bromine compounds that can be used as the constituent (a) are:
bis(2,5-dibromocyclopentyl)-dibromomethane,
bis(2,4,6-tribromocycloheptyl)-methane,
1,3-bis(2,3,4,5,6,7,8-heptabromocyclooctyl)-1,2,3,4-tetrabromobutane, especially 1,3-bis(3,4,5-tribromocyclohexyl)-2-dibromomethylpropane, and in particular 1,2-bis(3,4-dibromocyclohexyl)-1,2-dibromomethane.

Examples of brominated cycloalkanes that can be used as constituent (b) are: 1,2,3,4,5,6-hexabromocycloheptane, especially 1,2,3,4- or 1,2,4,6-tetrabromocyclooctane or, in particular, 1,2,5,6,9,10-hexabromocyclododecane.

Preferably used as active substance is 1,2-bis(3,4-dibromocyclohexyl)-1,2-dibromoethane on its own.

These brominated compounds are known or can be produced by known methods, e.g. by bromination of the corresponding bis-cycloalkenyl-alkylene or of the corresponding unsaturated cycloaliphatic compound, especially of bis-cyclohexenyl-ethylene or of cyclododecatriene-1,5,9.

Suitable as constituent (c) are the customary dispersing agents, e.g. those commonly used in the dyestuff and textile industry. Examples that may be mentioned are: lignin sulphonate, aromatic sulphonic acids, saturated-aliphatic dicarboxylic acids substituted with longer alkyl radicals, condensation products from aromatic sulphonic acids and formaldehyde, alkylphenol-ethylene oxide adducts, fatty acid, fatty amine or fatty alcohol ethylene oxide adducts, sulphonated substituted benzimidazoles and sulphonated fatty acid amides. Good results are obtained, in particular, with lignin sulphonates, with ethylene oxide adducts from alkylphenols, fatty amines, fatty alcohols or fatty acids, with substituted benzimidazoles, and especially with condensation products from aromatic sulphonic acids and formaldehyde.

Dispersing agents preferably employed are those which produce at elevated temperature, e.g. at 180° C. to 220° C., no yellowing of the treated substrate, or at most a yellowing that is removable on subsequent washing. In other words, the dispersing agents either should not decompose at elevated temperature or should merely form soluble or volatile decomposition products. The amount of dispersing agent used is preferably between 1 and 60 per cent by weight, relative to the constituent (a), and optionally to the sum of the constituents (a) and (b). Particularly good results are obtained with 1 to 50, especially with 1 to 20 and in particular with 1 to 4, per cent by weight of dispersing agent, relative to the constituent (a), and optionally to the sum of the constituents (a) and (b).

In order to increase storage stability, the aqueous suspensions or dispersions can also contain a protective colloid (constituent d). The protective colloids normally employed in industry are suitable, such as polyvinyl alcohol, polyvinylpyrrolidone, methylcellulose, carboxymethylcellulose, hydroxyethyl- or hydroxypropylcellulose, gelatine, acid casein, starch paste or polymers of monomers of the acrylic acid series, such as polyacrylic acid, ethyl acrylate copolymers or methyl methacrylate copolymers. Good results are obtained, in particular, with polyvinyl alcohol, hydroxyethylcellulose and especially with carboxymethylcellulose.

The aqueous preparations contain as a rule 50 to 700 g/kg, preferably 200 to 700 g/kg, particularly 200 to 500 g/kg, of brominated compound as constituent (a); 0 to 350 g/kg, preferably 0 to 250 g/kg, of brominated cycloalkane as constituent (b); 0.1 to 300 g/kg, preferably 0.2 to 200 g/kg, particularly 5 to 40 g/kg, of dispersing agent as constituent (c); and 0 to 30 g/kg, preferably 0 to 10 g/kg, of protective colloid as constituent (d). In each case the amount is made up with water to 1 kg.

The constituent (a) and optionally the constituent (b) are advantageously ground as aqueous dispersions in the presence of a dispersing agent in such a manner that the particles have a mean diameter of 1 to 30μ, preferably 1 to 20μ. Good results are obtained, in particular, with dispersions having a particle size of 1 to 10μ, especially 1 to 5μ. The particle size in itself has no effect on the attainable fireproofing effects, but it does have an effect on the stability of the dispersions.

The brominated compounds have only poor wettability, so that they are advantageously suspended not just immediately before application but previous to this. Pure suspensions, i.e. those without an addition of dispersing agent, are however unstable, and the constituent (a) and optionally the constituent (b) rapidly settle out, an effect rendering impossible an application to fiber materials. There is therefore always added to the aqueous preparations of the invention a dispersing agent, since this prevents any rapid settling out of the constituent (a) and optionally of the constituent (b). This sedimentation can be prevented almost completely by the addition of a protective colloid. The protective colloids can be incorporated into the dispersion either before or after grinding.

Stable dispersions of this kind can, if required, be converted in a manner known per se, e.g. in a spray dryer or in a normal paddle dryer, into solid commercial preparations which can be redispersed at any time.

The grinding of the constituent (a) and optionally of the constituent (b), which are preferably in the solid state, is performed in customary apparatus suitable for such purposes, e.g. in a glass-ball mill or in a sand mill or in a corundum disk mill.

The invention relates also to a process for the fireproofing of synthetic fiber materials consisting of polyester or polyamide with the aid of an organic bromine compound, in which process these materials are treated with the aqueous fireproofing composition of the invention and are subjected to a heat treatment, with the procedure being such that the deposit of constituent (a) or optionally the sum of the deposits of constituents (a) and (b) after heat treatment, relative to the fiber material treated, amounts to 0.5 to 12 percent by weight.

The fireproofing composition, which is in the form of a concentrated aqueous emulsion, particularly however in the form of a concentrated aqueous suspension, is so diluted with water to obtain a liquor that, with account being taken of the liquor absorption by the fiber material to be treated, the required deposit of the constituent (a), or optionally of the sum of the deposits of constituents (a) and (b), is ensured.

The process according to the invention comprises a method whereby the fiber material, after treatment with the aqueous fireproofing composition, is dried and, optionally, subjected to a heat treatment at elevated temperature. One suitable method consists in drying the treated material at a temperature of up to 100° C., e.g. at 70° to 100° C., and then subjecting it to a heat treatment at above 100° C., e.g. at 100° to 220° C., or especially at 150° to 220° C., i.e. subjecting it to the thermosol treatment.

The thermosol treatment is preferably performed at 175° to 220° C. and takes as a rule 10 to 200 seconds, preferably 20 to 100 seconds. Particularly good results are obtained with 10 to 60 seconds and especially with 20 to 60 seconds.

The procedure according to the invention is preferably carried out in such a manner that the deposit of constituent (a), or optionally the sum of the deposits of constituents (a) and (b), obtained by suitable dilution of the fireproofing composition with water is, depending on the nature of the fiber material and on the weight per unit area thereof, 1 to 9 percent by weight or, in particular, 1 to 7 percent by weight, relative to the weight of the fiber material treated.

The polyester and polyamide fiber materials, which are rendered fireproof according to the invention, can be in any desired stage of processing, i.e. they can be treated in the form of staple or continuous filaments, or of fabrics or knitwear, dyed or undyed, or in the form of textiles already further processed. Preferably, however, the material to be treated is always textile fiber material.

The fireproofing composition containing the constituent (a) and optionally the constituent (b) can be applied to the fiber material by conventional methods, e.g. by rinsing, printing or, preferably, by absorption onto the material, or especially by padding.

The materials to which the fireproof finish is preferably imparted are polyester fiber materials. They are preferably those that are derived from terephthalic acid, e.g. poly(ethylene glycol terephthalate) or poly(1,4-cyclohexylenedimethyleneterephthalate). Polyester fibers to which an effective fireproof finish according to the invention can be imparted are described, e.g., in the U.S. Pat. Nos. 2,465,319 or 2,901,446.

Suitable polyamide fibers are, e.g. those made from poly-2-caprolactam, polyhexylmethylenediamine-adipate or poly-ω-aminoundecanoic acid.

There are obtained according to the invention on polyester fiber materials and on polyamide fiber materials permanent fireproofing effects which are retained even after several washings or dry cleanings. The finishes obtained have moreover the advantage that the handle of the fireproofed fiber materials is not found to be oily, such as is often so in the case of known fireproofing compositions. Furthermore, the proneness of the fabrics to become soiled in the dry state and in the wet state is greatly reduced. The fastness to light and to rubbing of dyeings is scarcely affected.

A particular advantage of the process according to the invention is that better fireproofing effects are obtained with deposited amounts that are smaller than those required in the case of known processes.

As a result of the present fireproof finishing, the textile-mechanical properties of the treated fibre materials are not moreover disadvantageously affected. By virtue of the small amount deposited, there is furthermore scarcely any impairment of, in particular, the good handle properties of the fabrics treated. The same applies with regard to the low bending stiffness and to the high resistance to tearing of the finished fibre materials. Even printed fabrics can be treated according to the invention without the quality of the printing in any way becoming impaired.

The present fireproofing compositions can also be used simultaneously with dyestuffs or optical brighteners, so that dyeing or brightening and fireproofing can be performed in one process.

Also with the use of small amounts of dispersing agent, e.g. 0.1 to 3 percent by weight relative to the liquor, good results are obtained, so that subsequent washing can optionally be dispensed with.

Percentage values in the following production instructions and in the Examples are percentages by weight.

PRODUCTION INSTRUCTIONS FOR DISPERSIONS

A. 220 g of 1,2-bis(3,4-dibromocyclohexyl)-1,2-dibromoethane (abbreviated to BDCDE) is dispersed in a solution of 18 g of a condensation product from naphthalenesulphonic acid and formaldehyde in 114 g of water and ground in a glass-ball mill to a mean particle size of 20µ. After completion of grinding, there is added to the formulation 88 g of a 10% solution of carboxy- The individual fabric specimens are then tested with respect to their fireproof property (Vertical test DIN 53 906, ignition time 3 seconds).

The results are given in the following Table I

Table I

| TREATMENT Liquors - No. | UNTREATED | TREATED WITH LIQUORS | | | | | | | | |
|---|---|---|---|---|---|---|---|---|---|---|
| | | I | II | III | II | II | III | III | IV | IV |
| ratio of dispersions A / B | | | | | | | | | | |
| % A | 50 | 50 | 10 | 50 | 50 | 10 | 10 | 100 | 100 | |
| % B | | 50 | 50 | 90 | 50 | 50 | 90 | 90 | 0 | 0 |
| % of BDCDE in dispersion A | | 50 | 50 | 50 | 50 | 50 | 50 | 50 | 50 | 50 |
| % of HBCD in dispersion B | | 50 | 50 | 50 | 50 | 50 | 50 | 50 | — | — |
| g of dispersion A / kg of liquor | | 77 | 123 | 25 | 123 | 123 | 25 | 25 | 185 | 185 |
| g of dispersion B / kg of liquor | | 77 | 123 | 222 | 123 | 123 | 222 | 222 | 0 | 0 |
| liquor absorption % | | 65 | 65 | 65 | 65 | 65 | 65 | 65 | 65 | 65 |
| thermosol treatment temperature °C. | | 200 | 200 | 200 | 160 | 180 | 160 | 180 | 200 | 200 |
| thermosol treatment time (seconds) | | 60 | 60 | 60 | 60 | 60 | 60 | 60 | 20 | 60 |
| % deposit after thermosol treat. (a) (b) | | 4,8 | 6,7 | 7,4 | 6,5 | 6,3 | 7,7 | 7,2 | 6,6 | 6,2 |
| handle after subsequent washing (c) | 0 | 1 | 1 | 1½ | 1 | 1 | 1½ | 1½ | 1 | 1 |
| columns - No. | 1 | 2 | 3 | 4 | 5 | 6 | 7 | 8 | 9 | 10 |
| fireproofness | | | | | | | | | | |
| - after thermosol treatment | | | | | | | | | | |
| burning time sec. | 19 | 3 | 0 | 0 | 2 | 0 | 0 | 0 | 0 | 2 |
| spreading length cm. | 15 | 8 | 9,5 | 10,5 | 9,5 | 8,5 | 10 | 12 | 10,5 | 9 |
| - after 40 machine washings | | | | | | | | | | |
| burning time sec. | 19 | 1 (e) | 0 | 0 | 1 | 0 | 1 | 0 | 0 | 0 |
| spreading length cm. | 14,5 | 9,5 (e) | 9 | 10 | 9 | 8 | 10 | 12 | 10 | 9 |
| column No. | 1 | 2 | 3 | 4 | 5 | 6 | 7 | 8 | 9 | 10 |

(a) deposit as sum BDCDE : HBCD
(b) determined by bromine analysis of the treated fabric
(c) handle values
   0 unchanged
   1 trace stiffer than 0
   2 somewhat stiffer than 0
   3 stiff
   4 very stiff
(d) after 20 machine washings methylcellulose (degree of etherification 0.85; viscosity of the 1% solution = 10–20 cP), and the added solution is stirred in. There is obtained a readily flowable, storage-stable dispersion which on settling out gives an easily re-dispersable sediment.

B. 220 g of 1,2,5,6,9,10-hexabromocyclododecane (abbreviated to HBCD) is dispersed in a solution of 9 g of a condensation product from naphthalenesulphonic acid and formaldehyde in 167 g of water and ground in a glass-ball mill to a mean particle size of 10µ. After completion of grinding, 44 g of a 5% solution of carboxymethylcellulose (degree of etherification 0.85; viscosity of the 1% solution = 10–20 cP) is added to the formulation and stirred in. There is obtained a readily flowable, storage-stable dispersion that on settling out gives an easily re-dispersible sediment.

EXAMPLE 1

Polyester fabrics having a weight per unit area of 162 g/m² are padded with the aqueous liquors according to the following Table I, dried for 30 minutes at about 80° C., and subsequently subjected to the thermosol treatment for the given time and at the given temperature.

The fabric is then washed for 5 minutes at 60° C. in a liquor containing per liter 4 g of anhydrous sodium carbonate and 1 g of a condensation product from 1 mole of p-nonylphenol and 9 moles of ethylene oxide. The material is subsequently rinsed and dried.

The handle of the respective fabrics is tested after washing.

The fabrics are afterwards washed for 45 minutes at 60° C., in a domestic washing machine, in a liquor containing per liter 4 g of a household detergent (SNV 198 861-washing).

EXAMPLE 2

The procedure is performed as described in Example 1 but the material treated is polyamide fabric having a weight per unit area of 177 g/m², and 10 washings are carried out in the domestic washing machine.

The results are shown in the following Table II.

Table II

| TREATMENT | UN-TREATED | TREATED WITH LIQUORS | |
|---|---|---|---|
| LIQUORS - No. | | II | III |
| ratio of dispersions A / B % A | | 50 | 10 |
| % B | | 50 | 90 |
| % of BDCDE in dispersion A | | 50 | 50 |
| % of HBCD in dispersion B | | 50 | 50 |
| g of dispersion A / kg of liquor | | 123 | 25 |
| g of dispersion B / kg of liquor | | 123 | 222 |
| liquor absorption % | | 65 | 65 |
| thermosol treatment temperature °C. | | 200 | 200 |
| thermosol treatment time sec. | | 60 | 60 |
| % deposit after thermosol treat. (a) (b) | | 5,8 | 4,4 |
| handle after subsequent washing (c) | 0 | | |
| fireproofness | | | |
| - after thermosol treatment | | | |
| burning time sec. | 16 | 1 | 0 |
| spreading length cm. | 14,5 | 9,5 | 10,5 |
| - after 10 machine washings | | | |
| burning time sec. | 16 | 7 | 2 |
| spreading length cm. | 14 | 10,5 | 10 |
| column No. | 1 | 2 | 3 |

(a) deposit as sum BDCDE + HBCD
(b) determined by bromine analysis of the treated fabric
(c) handle values
0 unchanged
1 trace stiffer than 0
2 somewhat stiffer than 0
3 stiff
4 very stiff

We claim:

1. A process for the fireproofing of synthetic textile fiber materials consisting of polyester or polyamide, which comprises, treating said materials after their manufacture with a fireproofing composition containing at least (a) a bromine compound of the formula $$Br_m - A_1 - R - A_2 - Br_n$$
$$|$$
$$Br_{p-1}$$

wherein $A_1$ and $A_2$ each represent cycloalkyl having 5 to 8 ring carbon atoms, R represents alkylene having 1 to 4 carbon atoms, m and n each represent an integer from 2 to 7, and p represents an integer from 1 to 5, and (c) a dispersing agent;

and then subjecting said materials to a heat treatment, the heat treatment being such that the deposit of constituent (a) after the heat treatment is 0.5 to 12 percent by weight, relative to the treated material.

2. A process of claim 1, wherein the fireproofing composition further contains (b) a brominated cycloalkane having 7 to 12 ring carbon atoms and 4 to 6 bromine atoms bound to these ring carbon atoms.

3. A process of claim 1, wherein the fireproofing composition further contains (d) a protective colloid.

4. A process of claim 1, wherein the fireproofing composition further contains (e) water.

5. A process of claim 1, wherein the fireproofing composition contains as constituent (a) a bromine compound of the formula.

$$Br_2 - A_1 - CH - CH - A_1 - Br_2$$
$$| \quad |$$
$$Br \quad Br$$

wherein $A_1$ represents cycloalkyl having 5 to 8 ring carbon atoms.

6. A process of claim 1, wherein the fireproofing composition contains as constituent (a), 1,2-bis(3,4-dibromocyclohexyl)-1,2dibromoethane.

7. A process of claim 1, wherein the constituent (a) is in powder form and has a mean particle diameter of 1 to 30μ.

8. A process of claim 1, wherein the fireproofing composition contains as constituent (b), a brominated cycloalkane having a melting point of between 80° and 230° C.

9. A process of claim 1, wherein the fireproofing composition contains as constituent (b), 1,2,5,6,9,10-hexabromocyclododecane.

10. A process of claim 1, wherein the fireproofing composition contains as constituent (c), lignin sulphonates, ethylene oxide adducts from alkylphenols, fatty amines, fatty alcohols or fatty acids, aromatic sulphonic acids or their condensation products with formaldehyde, saturated-aliphatic dicarboxylic acids substituted with higher alkyl radicals, sulphated substituted benzimidazoles or sulphonated fatty acid amides.

11. A process of claim 1, wherein the fireproofing composition contains as constituent (c), condensation products from aromatic sulphonic acids with formaldehyde.

12. A process of claim 1, wherein the fireproofing composition contains as constituent (d), polyvinyl alcohol, hydroxyethyl- or carboxymethylcellulose.

13. A process of claim 1, wherein the fireproofing composition contains as constituent (d), carboxymethylcellulose.

14. A process of claim 1, wherein the fireproofing composition contains: 50 to 700 g of constituent (a) per kg, 0.1 to 300 g of constituent (c) per kg, said composition further contains as additional constituents, 0 to 350 g of constituent (b) per kg of a brominated cycloalkane having 7 to 12 ring carbon atoms and 4 to 6 bromine atoms bound to these ring carbon atoms and 0 to 30 g of constituent (d) per kg of a protective colloid made up with water to 1 kg.

15. The textile fiber material treated by the process of claim 1.

* * * * *